US009141886B2

(12) United States Patent
Auclair et al.

(10) Patent No.: US 9,141,886 B2
(45) Date of Patent: Sep. 22, 2015

(54) METHOD FOR THE AUTOMATED EXTRACTION OF A PLANOGRAM FROM IMAGES OF SHELVING

(75) Inventors: Adrien Auclair, Paris (FR); Anne-Marie Tousch, Colombes (FR)

(73) Assignee: CVDM SOLUTIONS, Paris (FR)

( * ) Notice: Subject to any disclaimer, the term of this patent is extended or adjusted under 35 U.S.C. 154(b) by 3 days.

(21) Appl. No.: 14/004,714

(22) PCT Filed: Mar. 5, 2012

(86) PCT No.: PCT/FR2012/000076
§ 371 (c)(1),
(2), (4) Date: Sep. 12, 2013

(87) PCT Pub. No.: WO2012/131181
PCT Pub. Date: Oct. 4, 2012

(65) Prior Publication Data
US 2014/0003729 A1     Jan. 2, 2014

(30) Foreign Application Priority Data

Apr. 1, 2011   (FR) ..................................... 11 00980

(51) Int. Cl.
*G06K 9/62*         (2006.01)
*G06K 9/72*         (2006.01)
(Continued)

(52) U.S. Cl.
CPC ............ *G06K 9/6296* (2013.01); *G06K 9/6292* (2013.01); *G06K 9/72* (2013.01); *G06Q 10/087* (2013.01); *G06Q 30/0201* (2013.01); *G06K 9/62* (2013.01); *G06K 2209/17* (2013.01)

(58) Field of Classification Search
CPC ............ G06Q 20/208; G06Q 20/3276; G06Q 30/0643; G06F 17/30; G06F 3/0312; G06F 3/0317; G06F 17/3025; G06F 17/30247; G06F 17/30876; G06F 3/04886; G06K 9/00664; G06K 9/00335; G06K 9/6292; G06K 9/6296; G06K 9/00234; G06K 9/00281; G06K 9/00288; G06K 9/00617; G06K 9/3216; G06K 9/00778; H04N 7/188; H04N 7/181; G06T 7/00; G07C 9/00

USPC ......... 382/100, 209, 218, 219, 224, 284, 103, 382/159, 239, 167, 118, 135, 283
See application file for complete search history.

(56) References Cited

U.S. PATENT DOCUMENTS 5,668,897 A * 9/1997 Stolfo ........................... 382/283
5,675,129 A * 10/1997 Burns et al. ................ 178/18.01
(Continued)

FOREIGN PATENT DOCUMENTS

WO        2009/027839 A2      3/2009

OTHER PUBLICATIONS

International Search Report, dated Apr. 26, 2012, from corresponding PCT application.

*Primary Examiner* — Vu Le
*Assistant Examiner* — Aklilu Woldemariam
(74) *Attorney, Agent, or Firm* — Young & Thompson

(57) ABSTRACT

A method for automatically constructing a planogram from photographs of shelving, replacing laborious manual construction includes the following steps: a step (1) in which the images are received, a step (2) in which the images are assembled, a step (3) in which the structure is automatically constructed, a step (4) in which the products are automatically detected, and a step (5) in which the products are positioned in the structure. The product detection step (4) enhances traditional image recognition techniques, using artificial learning techniques to incorporate characteristics specific to the planograms. This product detection step (4) also includes at least two successive classification steps, namely: an initialization step (41) with detection of product categories; and a classification step (42) with the classification of the products themselves, each of these steps including a first image recognition step, followed by a statistical filtering step based on the characteristics specific to the planograms.

17 Claims, 8 Drawing Sheets

Figure 1:
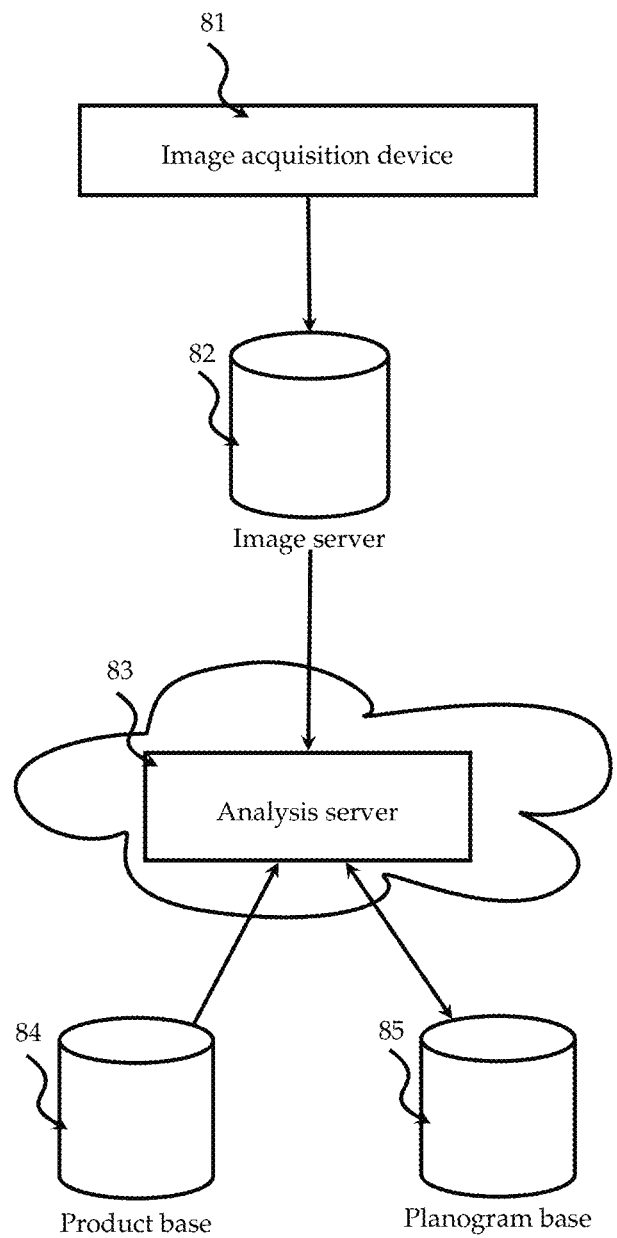

(51) Int. Cl.
*G06Q 10/08* (2012.01)
*G06Q 30/02* (2012.01)

(56) References Cited

U.S. PATENT DOCUMENTS

| | | | |
|---|---|---|---|
| 6,373,974 B2* | 4/2002 | Zeng | 382/135 |
| 7,308,110 B2* | 12/2007 | Rhoads | 382/100 |
| 8,515,136 B2* | 8/2013 | Mori et al. | 382/118 |
| 2002/0141640 A1* | 10/2002 | Kraft | 382/167 |
| 2003/0059121 A1* | 3/2003 | Savakis et al. | 382/239 |
| 2006/0098867 A1* | 5/2006 | Gallagher | 382/167 |
| 2006/0285755 A1* | 12/2006 | Hager et al. | 382/224 |
| 2008/0247598 A1* | 10/2008 | Movellan et al. | 382/100 |
| 2008/0294012 A1* | 11/2008 | Kurtz et al. | 600/300 |
| 2009/0012704 A1* | 1/2009 | Franco et al. | 701/200 |
| 2009/0059270 A1 | 3/2009 | Opalach et al. | |
| 2009/0060349 A1* | 3/2009 | Linaker et al. | 382/209 |
| 2009/0063306 A1* | 3/2009 | Fano et al. | 705/28 |
| 2009/0063307 A1* | 3/2009 | Groenovelt et al. | 705/28 |
| 2009/0097739 A1* | 4/2009 | Rao et al. | 382/159 |
| 2009/0192921 A1 | 7/2009 | Hicks | |
| 2011/0011936 A1 | 1/2011 | Morandi et al. | |
| 2011/0286628 A1* | 11/2011 | Goncalves et al. | 382/103 |

* cited by examiner

METHOD FOR THE AUTOMATED EXTRACTION OF A PLANOGRAM FROM IMAGES OF SHELVING

BACKGROUND OF THE INVENTION

Currently merchandising, that is to say "all studies and application techniques, used separately or conjointly by distributors and producers, with a view to increasing the profitability of the point of sale and the flow of products, by the continuous adaptation of the assortment to the needs of the market and by the suitable presentation of merchandise" (Institut Français du Merchandising, see the document "A. Wellhoff and J. E. Masson, *Le merchandising:* bases, nouvelles techniques, category management. Dunod, 2005"), requires daily monitoring and a great deal of effort. The presentation and enhancement of the product at the point of sale is an important element that triggers the act of purchase. Thus mass consumption brands sign agreements with distributors in order to ensure the availability of the right product, in the right place, in the right quantity, at the right price and at the right time (the 5Rs of Keppner). This obliges manufacturers to regularly check the correct positioning of their products in shop shelvings.

Checking the placement of each product is at the present time carried out manually. Employees are sent on site in order to inspect each shop and check agreement between the planogram and the actual placement of the products in the shop. Given the large number of shops and the number of products per shop, manual checking is extremely expensive and does not represent an optimum solution.

It is therefore appropriate to propose a method for the automatic construction of a planogram from one or more photographs of shelving.

Though the prior art is rich with regard to image recognition, the way in which we use these techniques for the automatic construction of planograms is novel. The general description of a technique for the automatic extraction of a planogram has already been made in the document "Agata Opalach, Andrew Fano, Fredrik Linaker and Robert Groenevelt, Planogram Extraction Based on Image Processing, WO2009/027839.A2, 2009", showing to what extent this type of invention may arouse interest. However, our invention is innovative in specifically adapting the image recognition methods to the extraction of planograms.

The image recognition part is itself constructed on the basis of various works of the prior art, including in particular the document "David G. Lowe, Method and Apparatus for Identifying Scale Invariant Features and Use of Same for Locating an Object in an Image, 2004". The detection of the products could use such algorithms directly. However, in practice, the application thereof for detecting products in images of shelving proves insufficient, in particular when the products have variations in texture, or when different products have very similar visuals, and these algorithms return incomplete and partially erroneous results.

SUMMARY OF THE INVENTION

Several novelties are introduced in order to improve the results:
exploitation of specificities related to the context of use. The idea of using context for detecting an object in the prior art is relatively recent (see the document "Carolina Galleguillos and Serge Belongie. Context based object categorization: A critical survey. *Computer Vision and Image Understanding*, 114(6):712-722, June 2010"). In our invention, this concept is used in a specialised way to improve the extraction of products from shelving images and is introduced in an original manner;

object recognition algorithms are often specialised for one of the following tasks: detection of a clearly defined category of object, detection of similar objects, identification of instances of a defined category of object. Our method is innovative in that it uses these three types of recognition in the same processing chain.

We propose such a method hereinafter, represented by the diagram in FIG. 4. The method comprises the following steps:

A step of receiving all the images (1) making up the shelving. These images can be acquired by various devices, including digital cameras and mobile telephones.

A step of assembling the images (2), in order to compose a single shelving image, in the case where there are several input images (1) for representing the shelving.

A step of automatic detection of the products (4) shown in the shelving image or images.

A step of automatic construction of the structure of the planogram (3), repeating the results of the previous step (4) and/or using specific image recognition methods.

A step of automatic positioning of the products on the planogram (5), repeating the results of the step of automatic detection of the products (4) and the results of the step of automatic construction of the structure (3).

The main characterisation of this method is that it comprises a step of detection of products (4) specifically oriented for merchandising applications in that it is constructed from image recognition techniques and artificial learning techniques for integrating features specific to the planograms. This product detection step is characterised in that it comprises at a minimum two classification steps:

1. an initialisation step (41), performing a detection with regard to the product categories,
2. a classification step (42), performing a classification with regard to the products themselves, each of these steps including a first detection/classification step (71), followed by a filtering step (73), based on the features specific to the planograms and/or products.

More precisely, the first step (41) makes it possible to estimate a first set of candidates in the form of ordered pairs (hypothesis, probability of detection), wherein a hypothesis is itself an ordered pair (position in the image, identified product). This step (41) consists of a category classification step (4171) and a step of global filtering of these results (4173) using probabilistic methods for integrating information specific to the products (I12), for example information of the scale type.

The second step (42) estimates a new set of candidates from the first, keeping the same form. It consists of a classification step (4271) based on matchings of points of interest, and a second filtering step (4273) at the planogram level, integrating global information on the context (I2) previously estimated on a planogram base (I3).

Advantageously, the method can comprise, following the classification step (42), one or several more specialised classification steps (43):
a classification step using specifically the image colour information,
a classification step making it possible more specifically to discriminate between products from only a few details.

Advantageously, the global context information (I2) can comprise the following measurements, calculated on a planogram base (I3):
measurements of probabilities of co-occurrences between products, measurements of probabilities of vertical positioning of the products, measurements of frequency of the products.

These measurements can be integrated after an independent step of estimation of probabilities for each of the probability measurements defined in the global information (I2), using a parameterised probabilistic combination of type (B), wherein the parameters are previously determined by optimisation of a global recognition level.

Advantageously, the detection of the structure (3) is for example performed according to one of the following two methods:

by image processing before step (4), and using the results of the assembly step (2), enabling in particular use thereof in calculating the global information (I2), or from the results of the detection (4), in a case where the global information (I2) is calculated independently of the structure extracted (3O).

Advantageously, the initialisation step (41) at the start of the product detection step (4) will perform a classification of the windows using categories defined for example in one of the following ways:

by a semi-supervised classification of the products, a category grouping together products sharing the same geometric features, and the supervision serving only to keep the various images of the same product in the same category, by the semantic categories of products defined in the properties of the products (I12), that is to say in a completely supervised manner.

BRIEF DESCRIPTION OF THE DRAWING FIGURES

Figure 2:
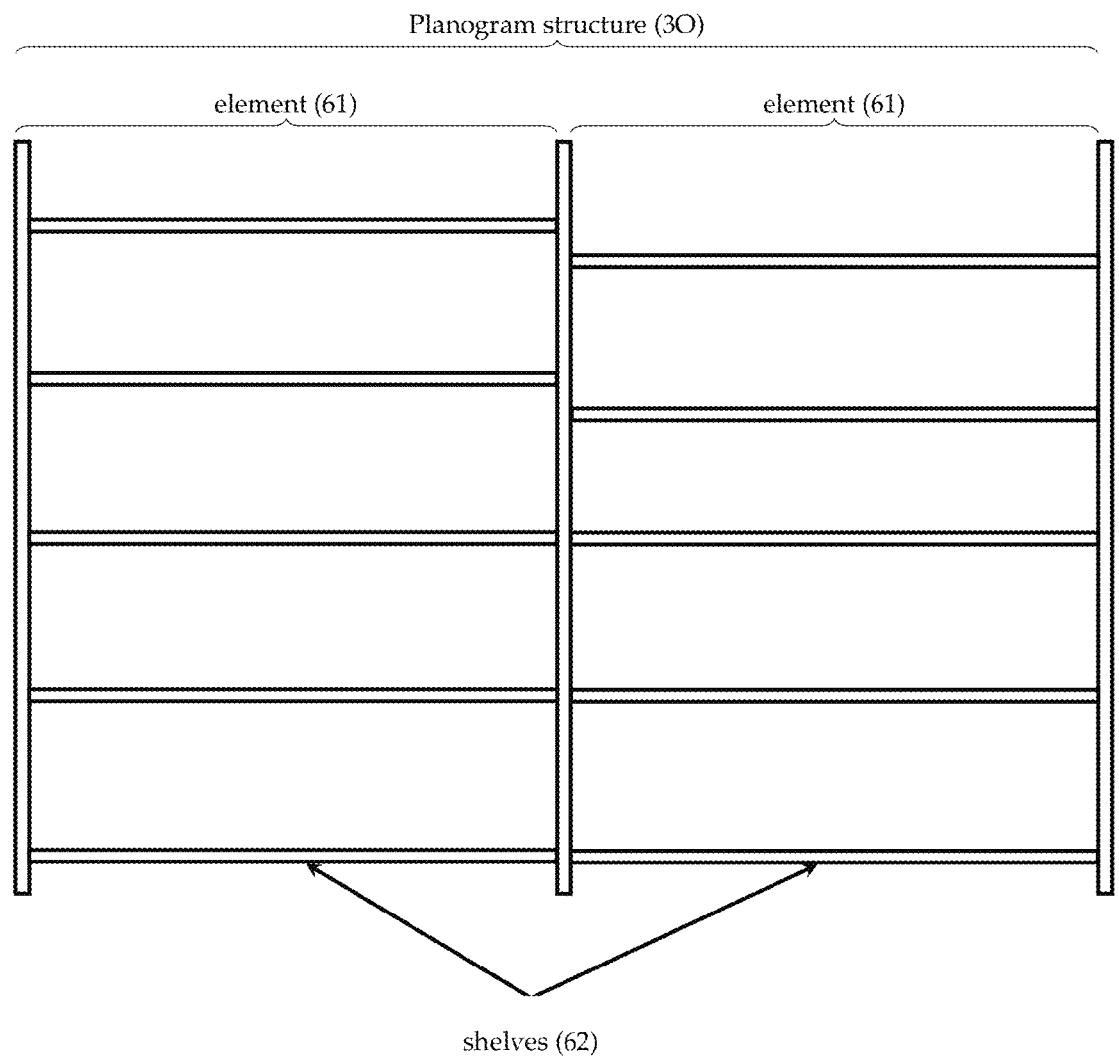
Figure 3:
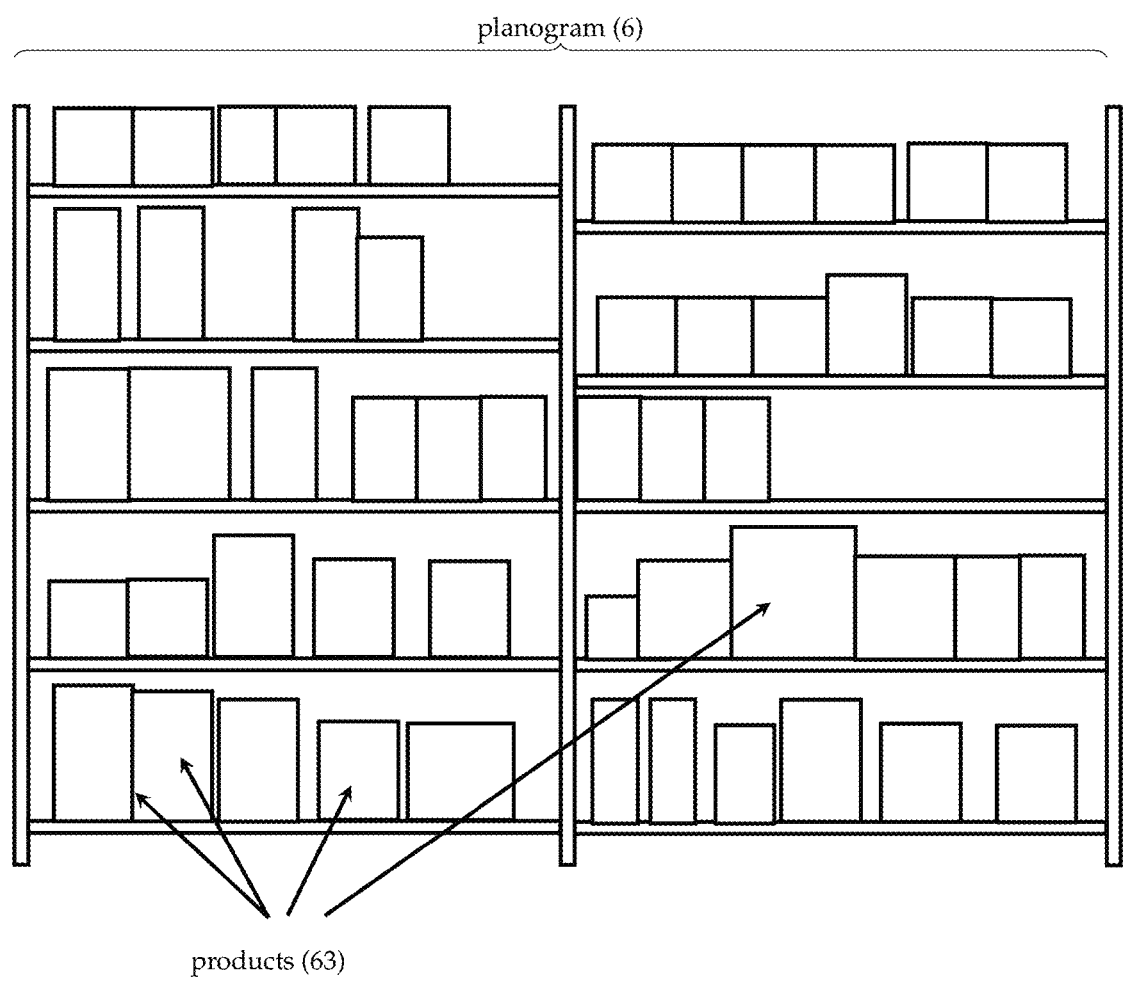
Figure 4:
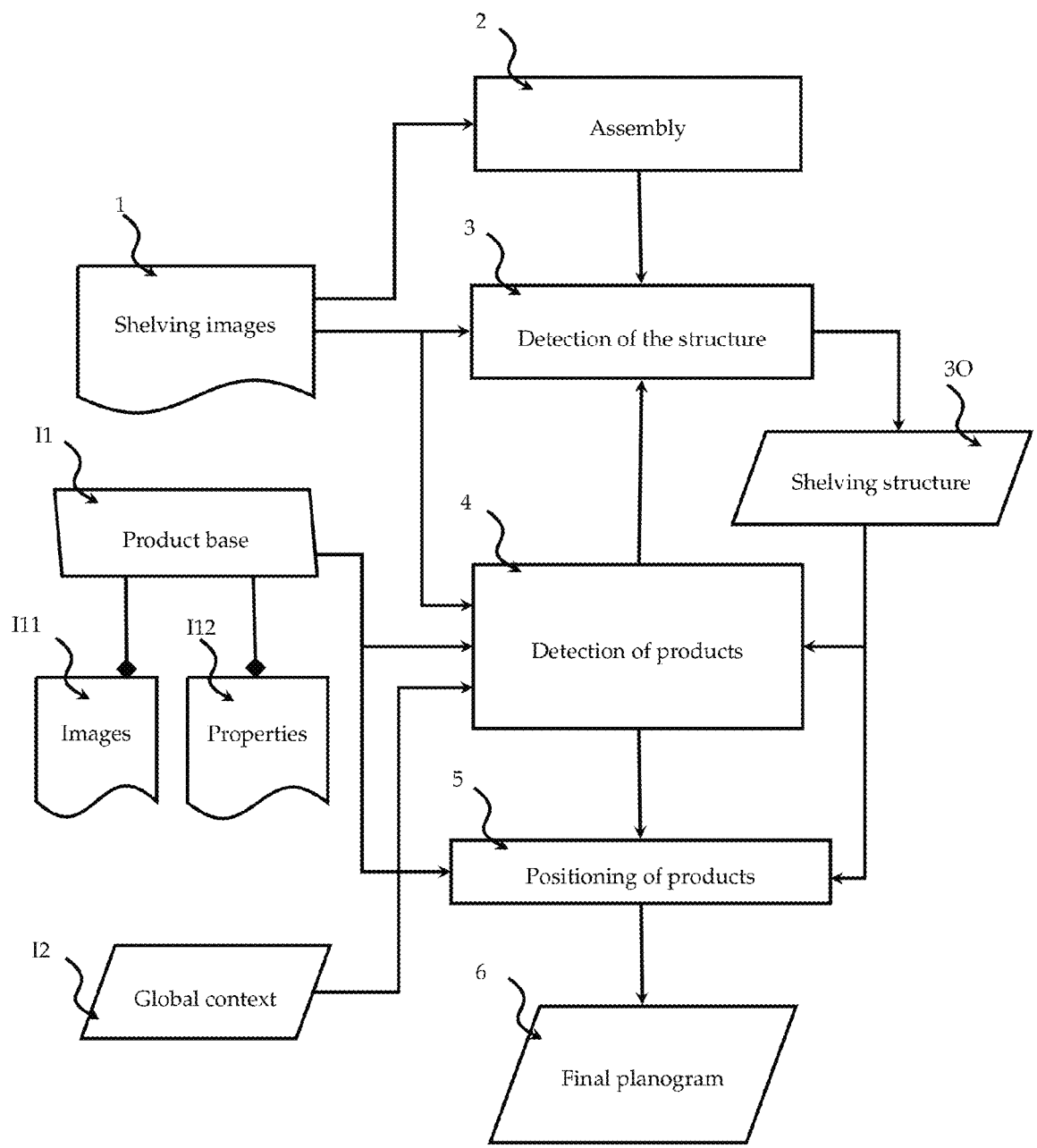
Figure 5:
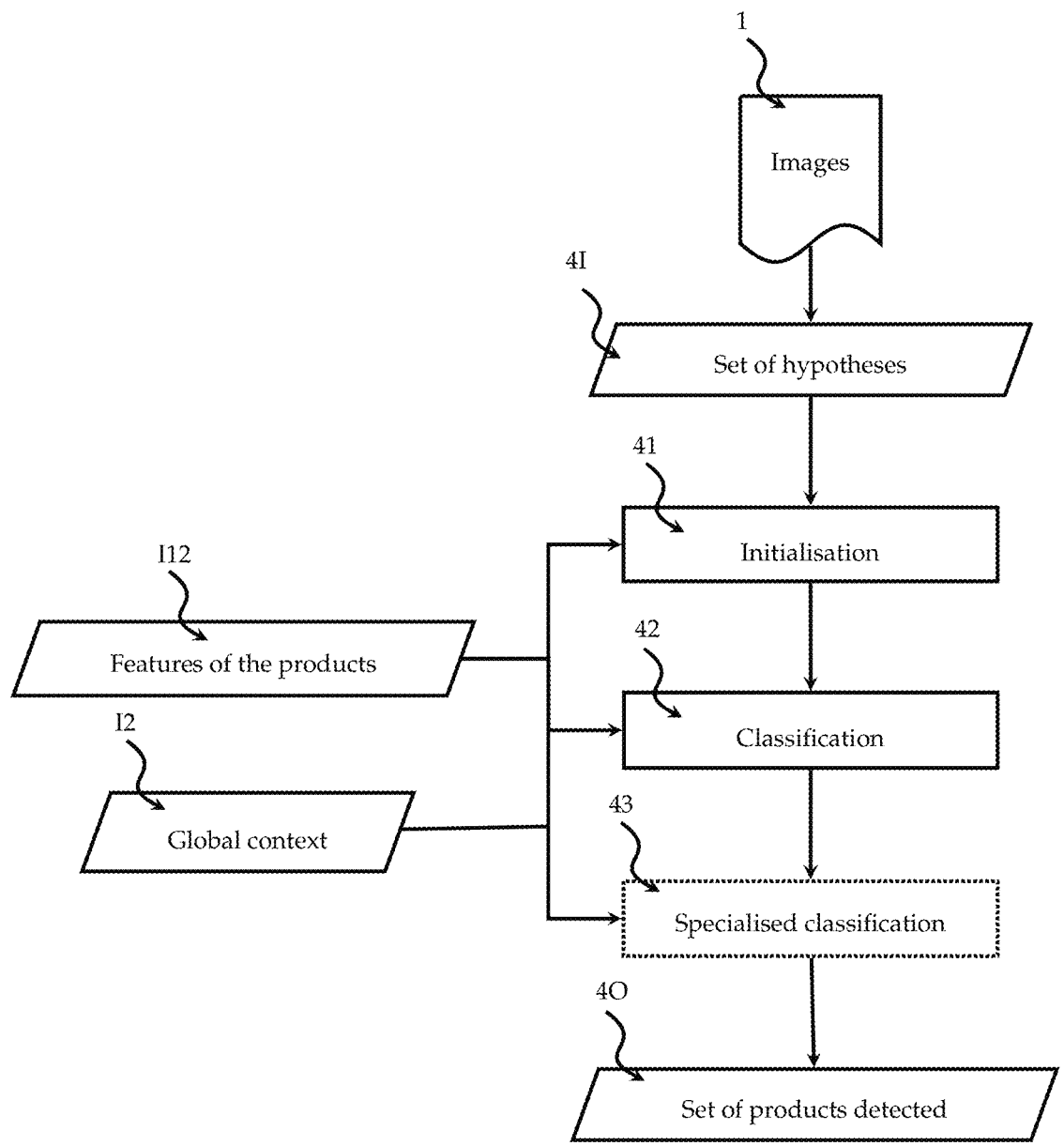
Figure 6:
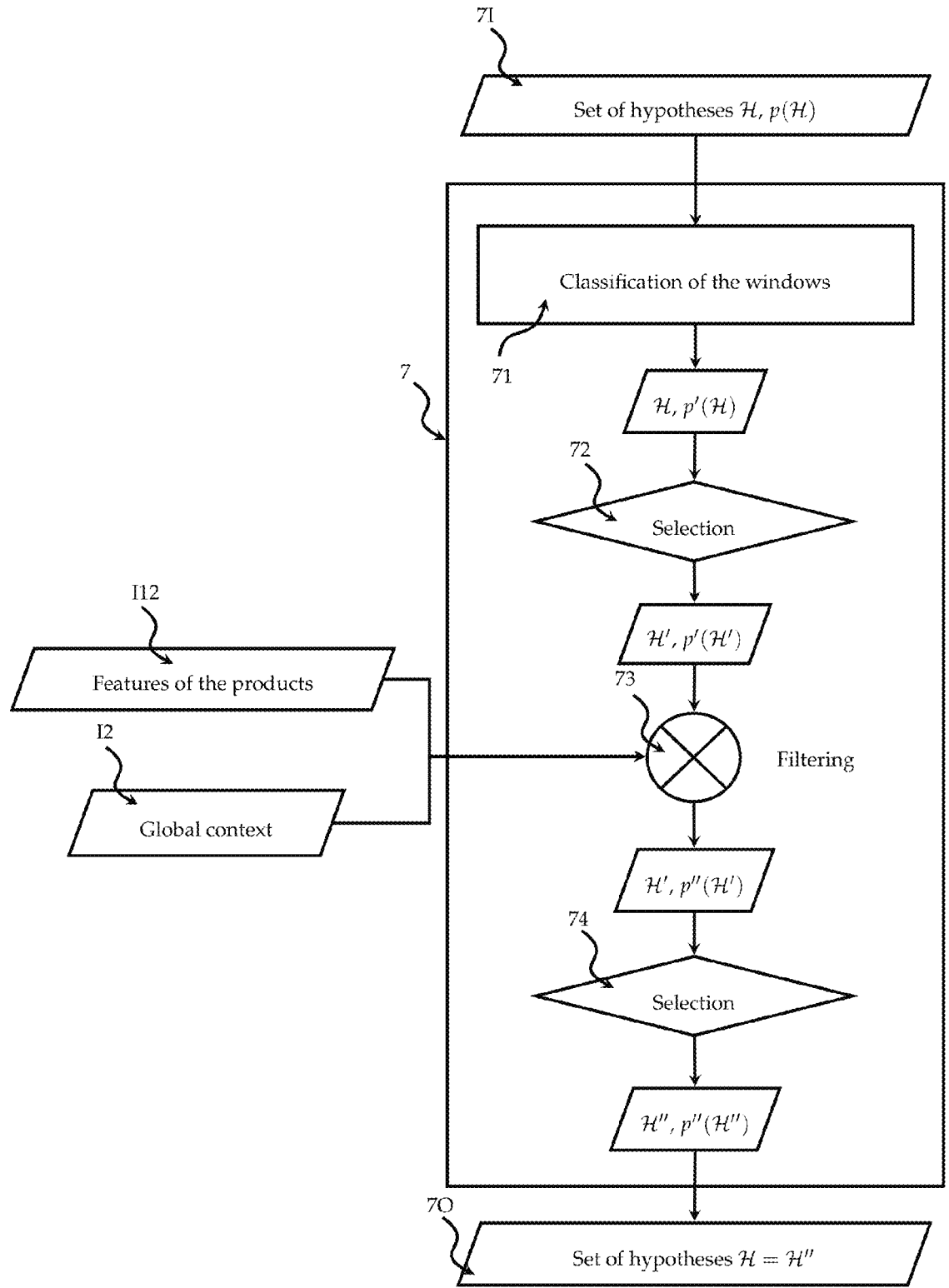
Figure 7:
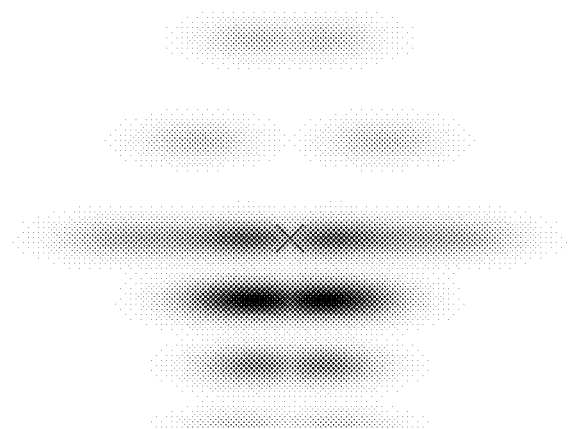
Figure 8:
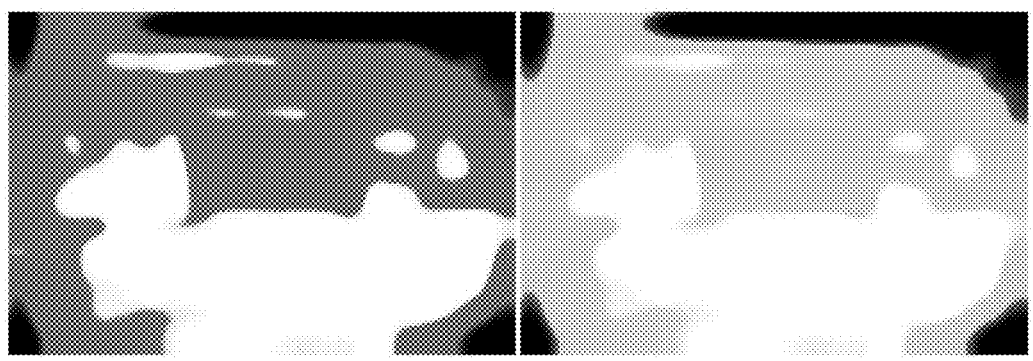
Figure 9:
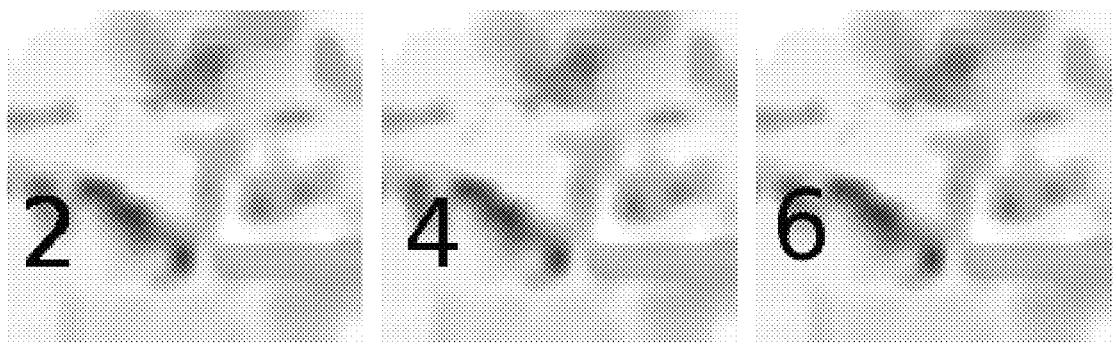

Other advantages and features of the invention will be understood better with the help of the description of the accompanying drawings, which show:

FIG. 1, a diagram showing a minimum device for implementing our method for the automatic construction of a planogram, FIG. 2, a diagram showing the structure of a planogram (3O), as constructed by our method, FIG. 3, a diagram showing a planogram (6) as constructed by our method, FIG. 4, a flow diagram showing the various steps constituting the method for the automatic construction of a planogram, FIG. 5, a flow diagram showing overall the various steps constituting the step for automatic detection of the products (4) with integration of the specific features (I12) and (I2), FIG. 6, a flow diagram detailing the steps inside a classification block (7) of FIG. 5, FIG. 7, an example of a co-occurrence map, describing the probability that two products appear according to certain spatial configurations, FIG. 8, a diagram showing an example of images of two products justifying the application of a supplementary colour classification step (43), FIG. 9, a diagram showing an example of images of three products justifying the application of a supplementary visual identification step (43).

DETAILED DESCRIPTION OF THE INVENTION

FIG. 1 is a diagram showing a minimum device for implementing our method for automatically constructing a planogram. An image acquisition device (81) creates images of shelving (1), stored on an image server (82). The analysis server (83) recovers the images (1) on the image server (82) in order to construct a planogram (6) using the product base stored on the data server (84), as well as the global context (I2) calculated from planograms stored in the planogram base (85). The final planogram (6) itself is stored in the base (85).

FIG. 2 is a diagram showing the structure of a planogram (3O), as constructed by our method. A structure (3O) is thus composed of elements (61) and shelves (62). FIG. 3 is a diagram showing a planogram (6) as constructed by our method, that is to say a planogram structure (3O) with a set of products (63) positioned according to the input images (1). A planogram (6) therefore consists of products and a set of elements (61) serving as a support for the products. An element consists of shelves (62). The element constituting the basis of the structure is therefore the shelf. In the final planogram, a product (63) is associated with a shelf.

FIG. 4 is a flow diagram showing the various steps constituting the method for the automatic construction of planogram. At the input of the method, not only the images (1) are found, but also:

the product base (I1), consisting of images (I11) and product properties (I12), global context information (I2), corresponding to specific trade knowledge extracted from a planogram base.

The shelving structure or structure of the planogram (3O) is an intermediate output of the method, necessary for constructing the final planogram (6).

The method consists of the following four steps:

a step of assembling (2) the various images (1), a step of detecting the structure of the shelving (3), a step of detecting the products (4), itself structured in several steps.

According to one embodiment of the method, this step uses the results of the structure detection (3), and may also make it possible to re-evaluate them, creating a cycle (3)-(3O)-(4)-(3), a step of positioning the products (5) detected at (4) on the structure (3O).

If several images (1) are supplied as an input of the method, the first step consists of assembling them. The assembly step (2) merges the images in a single one in order to have a panoramic image of the shelving. For this purpose it uses conventional algorithms (detection of points of interest, matching of these points, estimation of a matrix for passing from one image to another, projection into a single reference frame). It constitutes a necessary step of the method in the case where the shelving is represented by several images, in order to be able to calculate later the position of a product in a planogram whatever the image in which it is detected.

The present invention covers all the modes according to which the merger of the images can be performed. Implementation of the method is not limited to one or other fusion mode.

All the elements and shelves constitute the structure of the shelving (3O). The shelves are detected automatically (3). According to two possible embodiments, the detection of the shelves is done:

1. Independently of the product detection, by detecting the main horizontal lines, that is to say using image processing techniques on (1) combined with the results of the assembly (2), 2. Using the product detection (for example when the first solution fails). The height of the various shelves is estimated according to the position of the products after a product detection pass, assuming that the products are placed on the shelves (an assumption always realised in practice). This is because in this case the product base clearly defines the line positioning the shelf.

If there is only one image as an input, it is considered that there is only one element. Otherwise the vertical separations between elements can be estimated by assuming that the input images correspond to one image per element approximately, and taking account of overlaps necessary to the assembly (2) and revealed during this same step (2)

According to one embodiment of the present invention, the structure (3O) is integrated in the detection method at two levels. First, it is used to locate the search for the products (4) over the zones corresponding to shelves: the images are divided into several sub-images according to the position of the shelves. In this regard, integrating the structure constitutes an optimisation of the detection of objects—the product detection principle functions with or without.

Next, the structure (3O) can be used for example for defining certain elements of the context (I2), to which we shall return later. When it is included for this purpose, it forms part of the essential components of the object detection step according to one embodiment of the method according to the invention.

FIG. 5 is a flow diagram showing overall the various steps constituting the automatic product detection step (4) with integration of the specific features (I12) and (I2). The product detection step (4) is situated at the heart of the planogram construction method. The blocks (41), (42) and (43) describe steps of the method according to a typical diagram called the classification block (7) for integrating the features (I12) and (I2).

The aim is to discover the products of the base contained in the input image or images and their position relative to these.

The set of products contained in the base, assimilated to a set of labels, is denoted $L=\{l_1, \ldots, l_m\}$. A sub-part of the image is called a window $f$. According to one embodiment of the present invention, it is possible to have $f=\{x,y,w,h\}$ a rectangle extracted from an image, where (x,y) denotes the coordinates of the pixel from the top left of the rectangle in the image, and (w,h) is the width and height of the rectangle in pixels. At the output from (4), the objective is to have a "good" set of candidates (4O), where a candidate is an ordered pair (h,p(h)), where:

h is a hypothesis, associating a product with a window and denoted h=(f,l), and p(h) is the probability that this hypothesis is verified, that is to say the probability that the window $f$ contains the product l.

A "good" candidate has a "true" hypothesis h=(f,l), that is to say the window $f$ truly contains an image of the product l, associated with a "sufficient" probability, that is to say that any other hypothesis on the same window has a lower probability. A "good" set of candidates is a set containing as many "good" candidates as possible.

A set of hypotheses will be denoted $\mathcal{H}$, $p(\mathcal{H})$ the set of probabilities associated with these hypotheses, and ($\mathcal{H}$, $p(\mathcal{H})$) the resulting set of candidates.

In its most simple form, the detection would be based on an image recognition method of the conventional prior art for determining a list of candidate products, for example the method described in the document "David G. Lowe. Method and Apparatus for Identifying Scale Invariant Features and Use of Same for Locating an Object in an Image, 2004". In this case, apart from the shelving image (1), only the images of the product base (I1) would be used as an input. In general, this method gives a list of candidates that is firstly incomplete and which secondly contains errors.

Our invention constructs on this basis, but affords several improvements in particular by integrating the specific knowledge available:

1. on the input image (1): the structure of the shelving (3O),
2. on the product base (I1): their geometric (size, shape) and semantic (segment, sub-segment, etc., brand) properties (I12),
3. on the global context (I2): statistics calculated on a set of planograms (I3).

Our invention relates to the conjoint integration of this knowledge in the product detection method.

We begin by describing these various data. The features of the products (I12) are defined for each product in the product base (I1). In one embodiment, the following can in particular be used:

The categories of products, which correspond to various fields given in the base: brand, hierarchy of segments, type of packaging, etc.

The size of a product: the actual width and height of the product, in centimetres, are given.

The features of the products are used on several levels:

As from the first detection step, in order if necessary to supervise the definition of the product category detectors, To perform filtering, and for example to ensure consistency of size or brand.

The global context (I2) supplies important information, which it is advantageous to integrate in the object recognition method. The context is expressed in the form of 1D or 2D probability maps, integrated using probabilistic methods, to filter a set of candidates ($\mathcal{H}$, $p(\mathcal{H})$). The method according to the invention proposes introducing the following numerical features:

Maps of 2D co-occurrences,

Vertical positioning probability,

Frequency of a product.

These features are estimated on a learning base, containing a ground truth: a set of planograms (I3), created manually or created automatically and verified manually.

The context features (I2) are evaluated with respect to the reference frame of a planogram. If there are several shelving images (1) as an input, the features are introduced by using all the detections on the images. We shall return to this point later. We shall now detail the various global features that are estimated according to one implementation of the method according to the invention.

The first characteristic that we introduce is in the form of 2D co-occurrence maps. These maps make it possible for example to represent conjointly the relative disposition of the products and the frequency at which two products appear together:

Distances between products/relative positions: for example, products of the same brand and the same segment are generally grouped together in the same area. For example, for hams, generally the packets of 2 slices are found above the packets of 4, themselves above the packets of 6.

Frequencies of co-occurrences between products: some products never appear together (e.g. products from two different retailers), others are rarely in the same area (rillettes and a ham).

FIG. 7 gives an example of a map of co-occurrences between two products of the same brand and the same segment. The map represents the probability of finding the test product (product 2) for each position, when the reference product (product 1) is situated in the middle of the map (represented by a cross). The closer a pixel is to black, the more it is probable to find the product 2 at this position. In this example, it can therefore be seen that product 2 is generally situated below product 1, often to the side, and rarely above.

These maps are estimated over a learning set using a density estimator, for example a core density estimator (or Parzen estimator, according to the description in the document "Emanuel Parzen, On Estimation of a Probability Density Function and Mode. *Annals of Mathematical Statistics*, 33(3):1065-1076, 1962."). Thus, for an ordered pair of given products, a 2D probability density function is estimated. By denoting $x \in \Re^d$ the relative position of product 1 with respect to product 2, $x_i, i=1, \ldots n$ all the positions relating to these products in the learning base, the estimated probability density function $\hat{f}$ can be written as the following combination of Gaussians:

$$\hat{f}(x) = \frac{1}{n}\sum_{i=1}^{n} K_\sigma(x - x_i), \qquad (A)$$

where $K_\sigma$ is a Gaussian core, and where the parameter of the Gaussians $\sigma \in \Re^d$ is fixed empirically and depends on the chosen distances.

The vector $x \in \Re^d$ describing the relative positions of the two products can be defined in various ways. In its most generic form, d=2 and x corresponds to the distances in millimetres horizontally and vertically. In a form that is more specific to our application, the vertical distance explicitly integrates the structure of the shelving (3O): it is calculated as number of shelves.

A second characteristic that can be used according to one embodiment of the present invention represents the vertical positioning probability and exploits the fact that some products are placed rather overhead, others rather in bottom trays. For example, a large bottle will more probably be found at the bottom than at the top of a shelf. It is advantageous to include these particularities in the recognition method.

For this purpose, the 1D probability of finding a product at a certain height is estimated, in the same way as before, that is to say using a density estimator on the learning base (I3).

Finally, according to one embodiment of the present invention, the last characteristic is based on the prior probability of finding a product, that is to say its frequency. This is because the typical distribution of the products is not uniform. For ham, for example, packets of 4 are much more usual than packets of 8. The results of the detection can be adjusted in order to respect this pattern.

The frequency of each product is estimated on the learning base and can be updated regularly in order to take account of changes in a shelf over time.

According to one embodiment of the present invention, these three features, co-occurrence maps, vertical positioning probabilities and frequencies, represent the context (I2).

Having described the calculation of the input features, we shall now describe the detection method step by step.

Our object detection method (4) is described by the diagram in FIG. 5. Each step—"Initialisation" (41), "Classification" (42) and "Specialised classification" (43)—of this method corresponds to a classification block of type (7), according to the method described in FIG. 6. Each block (7) making it possible to integrate the specific features (I12) and (I2), they are therefore integrated at various levels. The last block (43) is optional and is therefore shown in broken lines in FIG. 5.

FIG. 6 is a flow diagram detailing the steps in a classification block (7) in FIG. 5. A classification block is composed of two main steps (71) and (73). In this diagram, a set of hypotheses $\mathcal{H}$ describes a set of associations between a product and a position of the image. Each hypothesis associating a product with an image is associated with a probability, which gives, for all the hypotheses, a set of probabilities $p(\mathcal{H})$. Each of the two steps (71) and (73) makes it possible to re-evaluate the probabilities of each hypothesis, and each is followed by a selection step, respectively (72) and (74), for selecting the best hypotheses.

We shall commence by explaining in general terms the method described by a block (7), illustrated in FIG. 6. We shall then detail how the general method structure of a block (7) is applied successively in the blocks (41), (42) and (43).

Let L be all the products contained in the base. Let F be all the windows extracted from the images (1). A hypothesis associates a product l with a window $f$ and is noted h=(f,l). The detection method associates each hypothesis with a probability p(h).

In statistical learning, a classifier is a function g: $X \mapsto Y$, where:
  X is the space of the inputs or characteristic vectors, that is to say the known data,
  Y is the space of the output or labels, that is to say the data that it is sought to estimate.

In binary classification the dimension of Y is equal to 2. Typically Y={−1,1}, and an input data item $x \in X$ is classified positively if y=g(x)=1, and negatively if y=g(x)=−1. In multiclass classification, the dimension of Y is greater than 2. In our method, Y=L is used and the dimension is equal to the number of products in the base (I1).

In this method, estimating the probability p(h) of a hypothesis h=(f,l) amounts to making a multiclass classification, where:
  the inputs of the classifier are the windows $f$(X=F),
  the labels output are the products l (Y=L),
  the classification gives a probabilistic output, estimation of p(h) where h=(f,l).

The set of hypotheses associated with a set of windows is denoted $\mathcal{H} = \{(f,l) | f \in F, l \in L\}$.

In the diagram in FIG. 5, a classification block (7) takes as an input a set of hypotheses $\mathcal{H}$ associated with a set of windows F={$f_1, \ldots, f_n$}, associated with probabilities p($\mathcal{H}$)={p(h)|h∈$\mathcal{H}$}. It returns as an output a sub-set $\mathcal{H}' \subset \mathcal{H}$ with the associated probabilities p"($\mathcal{H}$").

A block (7) comprises two main steps. The first so-called classification step (71) considers each window individually and uses image recognition techniques—comparing the input images (1) with the images in the base (I11)

in order to determine probabilities p'($\mathcal{H}$), where p'(h) is the probability that the product l is situated in the window $f$. According to these probabilities, a decision step (72) eliminates the least probable hypotheses, giving $\mathcal{H}' \subset \mathcal{H}$. For this new set of hypotheses $\mathcal{H}'$, the second so-called filtering step (73) re-evaluates the probabilities according to the a prioris, i.e. inputs (I12) and/or (I2), that is to say calculates p"($\mathcal{H}'$)={p"(h)|h∈$\mathcal{H}'$} relying on probabilistic methods. A new decision step (74) selects the best hypotheses $\mathcal{H}'' \subset \mathcal{H}'$.

The first step, being based on image criteria, works on each input image independently. The second step, on the other hand, effects a grouping of the results obtained on all the input images (1), in order to use features defined at the planogram (I2, 3O).

As can be seen in the diagram of FIG. 5, the complete detection method comprises at least two successive type blocks (7). Each block implements a different version of the classification and filtering, making it possible to successively integrate various features. Other blocks can be added, according to requirements, in order to manage certain common cases and increase the precision of the results. The various blocks are described hereinafter.

The initialisation block (41) considers as an input all the possible windows for a fixed number of scales (for example according to a sliding window mechanism). Typically, the set of hypotheses associated with a window consist of the set of products L, in accordance with a uniform distribution:

$$\forall h \in \mathcal{H}, \, p(h) = \frac{1}{|L|}.$$

The purpose of this first block (41) is to detect object categories. This block being in the form (7), it consists itself of two blocks (4171) and (4173). The classifier (4171) is a product category classifier.

According to one embodiment of the present invention, a product category is defined in a semi-supervised manner, according to the following method. For each image in the base (I11), a contour descriptor is extracted, typically a gradient orientation histogram. A data grouping algorithm is then applied in order to automatically determine a small number of forms representative of various products. In practice, a K-means algorithm will be used, keeping K small ($\leq 10$).

In principle, a product l may have several representatives, i.e. several images in the base (I11). Thus the set of products forms a partitioning of the set of images. If the definition of the categories remains non-supervised, it is not a priori guaranteed that all the representatives of a product l belong to the same group, i.e. that the partitioning according to the products is kept. We therefore introduce a supervision level, in the following manner: we modify the grouping algorithm so as to make it necessary, at each iteration, for all the representatives of the same product to be associated with the same group.

Finally, we obtain a division of the set of products (I1) into K categories $\lambda_1, \ldots, \lambda_K$, that is to say $\forall l \in L, \exists ! k \in \{1, \ldots, K\}, l \in \lambda_k$.

A category $\lambda$ describes a set of products showing the same geometric contour features. A classifier based on these categories is therefore more robust than a classifier defined directly on the products (i.e. where a category=a product). Moreover, automatic definition of the categories has the advantage of being able to apply indifferently to all types of product.

We then define a classifier of product categories, based on the same contour descriptors. The classifier (4171) associates a window f to a label $\lambda$ with a probability p, where the label $\lambda$ corresponds itself, as has just been defined, to a set of products. The positive classification of a window for a category therefore corresponds to the same number of hypotheses. Moreover, a given window can be classified positively for several categories.

Other ways of defining the categories of product used at this level are possible:

1. in a completely supervised manner: using fields given in the base, typically the packaging, for example for drinks: cans, small bottles, large bottles, etc.

2. in a semi-supervised manner: by performing a non-supervised learning of the forms for the various categories defined by fields given in the base, and using the categories for which it is possible to extract characteristic forms.

The second block (4173) effects a filtering of these hypotheses by integrating various a prioris, relying on probabilistic models. Several features can be integrated at this level. According to one embodiment of the present invention, we use the scale of the image for eliminating the most improbable hypotheses.

For each association of a window f with a product l, i.e. each hypothesis h, it is possible to estimate the scale of the image $\sigma(h)$, since the size of the window and the size of the product (I12) are available.

A global distribution of probability of the scales is deduced from this, assuming that there are n hypotheses $h=(f_i,l_i)$ each giving a scale $\sigma_i=\sigma(h_i)$:

$$p(\sigma) = \frac{1}{n} \sum_{i=1}^{n} K(\sigma - \sigma_i)$$

Then, for each detection, a new score is calculated using the posterior probability:

p'(h)∝p($\sigma$(h)|h)p(h),

∝p($\sigma$(h))p(h), since p($\sigma$(h)\h)=p($\sigma$(h)).

The hypotheses obtained at the output of this initialisation step (41) are both very numerous and very general. In particular, they do not make it possible to make a final decision on the products. This is because the classifier (4171), remaining at the category level, gives the same probability to all the products in a category. In theory, the estimation of the scale could allow a certain discrimination between the various products in the same class. In practice, the products in the same category often have the same scale.

A new classification step (42), finer, is therefore essential before being able to make a decision.

This step (42), being a block of type (7), is itself divided into two steps.

First, a classification step (4271) considerably reduces the set of hypotheses for each window. At this level, the method is based on the matching of points of interest in order to determine the images of the base corresponding to the input hypotheses that are most similar to the images represented by the candidate windows. An algorithm of the type described in the document "David G. Lowe. Method and Apparatus for Identifying Scale Invariant Features and Use of Same for Locating an Object in an Image, 2004" is used.

More precisely, an input window f is associated with a set of hypotheses $h_f=\{h=(f',l)|f'=f \text{ and } (f,l)\in \mathcal{H}\}$. A matching of points between f and all the images of the base corresponding to $\{l|h=(f,l)\in h_f\}$ is performed. Thus, for each hypothesis $h\in h_f$, there is a new detection probability p'(h), which is combined with p(h). A decision process (4272) eliminates the least probable candidates.

Secondly, the set of hypotheses detected for all the windows is used, to perform a new filtering (4273). This step requires knowledge of the structure of the shelving (3O). If it has not yet been performed independently, according to the definition of the context (I2), the step of detection of the structure (3) must be inserted at this level.

Still relying on probabilistic models, we introduce here the geometric and contextual criteria defined previously (I2). Each criterion makes it possible by itself alone to obtain a new probability p''(h) from p'(h), where h=(f,l)∈ $\mathcal{H}$ '. In order to lighten the notations, we shall for the time being denote p'=p, p''=p'. According to one embodiment of the present invention, the first criterion is the frequency of a product. From the frequency p(l) of the product l, $p_f$(h) is estimated. A second possible criteria is called the vertical positioning of a product. The vertical position of a window $f$ is denoted $f_v$, and $f_h$ its horizontal position, so that $f=(f_h, f_v)$. The vertical positioning probability gives the probability $p(f_v|l)$ that the product l is at the position $f_v$, and serves to estimate $p_v$(h). Finally, the third possible criterion, the 2D co-occurrence maps give the conditional probabilities p(h|h') between two hypotheses (h,h')∈ $\mathcal{H}$ '². Considering each pair, $p_c$(h) is estimated.

We state below how to evaluate these probabilities. First, we explain how these probabilities are combined in our method.

The objective is to estimate a probability p'(h) based on the various estimations obtained from p(h) and the context (I2), $p_f$, $p_v$, $p_c$. Moreover, we wish to maximise the recall rate, that is to say to obtain a maximum number of detections. According to one embodiment of the present invention, finally, we do not use any a priori on the relative importance of the various criteria introduced. According to this embodiment, we therefore combine these probabilities by optimising a sigmoid defined as follows:

$$p'(h \mid \theta) = \frac{1}{1 + e^{f_\theta(p(h))}}, \quad (B)$$

where p(h) is the input probability, from which there are estimated $p_f$(h), $p_v$h and $p_c$(h), and where $f_\theta$ is a linear combination of these various probabilities:

$$f_\theta(p(h)) = \alpha \cdot_f(h) + \beta \cdot p_{98}(h) + \gamma \cdot p_c(h) + \delta,$$

with $\theta=(\alpha,\beta,\gamma,\delta)\in \mathfrak{R}^4$ and under the constraint of $\alpha+\beta+\gamma=1$.

The parameter θ is for example estimated by maximising the recall on the learning set.

Let T={$(f_1,l_1), \ldots,(f_n,l_n)$} be the set of windows annotated in the ground truth. It is said that the hypothesis h=(f, l)∈T if $\exists (f_i,l_i)\in$T such that the two windows $f$ and $f_i$ are very close and l=$l_i$.

The recall rate $\mathfrak{R}_\theta$ is given by the level of true positives with respect to the number of positives:

$$\mathfrak{R}_\theta = \frac{TP_\theta}{TP_\theta + FN_\theta}$$

where $FN_\theta$ is the number of false negatives, that is to say the number of windows containing a product and incorrectly classified:

$$FN_\theta = |\{h|p'(h|\theta)<0.5 \text{ and } h\in T\}|$$

and $TP_\theta$ the number of true positives, that is to say the number of windows containing a product and to which the classification attributes a good product:

$$TP_\theta = |\{h|p'(h|\theta)\geq 0.5 \text{ and } h\in T\}|$$

According to one embodiment of the method, there is therefore the following optimisation:

$$\theta = \underset{\theta'}{\operatorname{argmax}} \mathfrak{R}_{\theta'}$$

with $$\theta' = (\alpha, \beta, \gamma, \delta) \in \mathfrak{R}^4$$

$$\alpha + \beta + \gamma = 1$$

We shall now detail possible operations for determining $p_f$, $p_v$ and $p_c$.

The more frequent a product, the more its detection is favoured, according to the number of candidates for this product. This can be represented by the following equation:

$$p_f(h) = p(l) \cdot \frac{p(h)}{\sum_{h'=(l',f'),l'=l} p(h')},$$

where:
p(h) is the input probability of (4273),
p(l) is the prior probability of the product l, estimated on the base of planograms (I3),
h'∈ $\mathcal{H}$ ' is a hypothesis,
the sum of the denominator is calculated on the set of hypotheses h' concerning the same product as h. This sum therefore corresponds to the probability of finding the product l in the images (1).

The vertical positioning probability introduces the probability of finding a product at a certain height. According to one embodiment of the present 2 0 invention, the following is estimated (the series of calculations making it possible to explain the notations):

$$p_v(h) = p_v(f, l) = p_v(f_v, f_h, l)$$

$$= p(f_v \mid l, f_h)p(l, f_h)$$

$$= p(f_v \mid l) \cdot \sum_{h'=(l',f'),l'=l,f'_h=f_h} p(h'),$$

where:
p(h) is the input probability of (4273),
$p(f_v|l)=p(f_v|l, f_h)$ is the vertical positioning probability of the product l, estimated on the base of planograms (I3), and assumed to be independent of the horizontal positioning of the product,
h'=(l', $f$')=(l', $f'_h$, $f'_v$) designates a hypothesis,
$p(l, f_h)=\Sigma_{h'=(l',f'),l'=l, f'_h=f_h}p(h')$ is estimated by marginalising $p(l, f_h, f_v)$ with respect to the vertical positions.

Finally, according to one embodiment of the present invention, in order to introduce the probabilities of co-occurrences, we use a vote mechanism.

The co-occurrence maps make it possible to estimate the conditional probability of a product with respect to another according to their relative positions, defined by equation (A). For each pair of hypotheses (h,h'), their relative position x(h, h'), dependent on the windows $f$, $f$', is calculated. The conditional probability of h with respect to h'p(h|h')=$\hat{f}$ (x(h,h')) is deduced from this. In practice, only the pairs appearing in the same vicinity are taken into account. This is because the probability of co-occurrence has some meaning only if the products are often close to each other. Moreover, this makes it possible to considerably reduce the computing time. The new probability $p_c(h)$ can be calculated as following:

$$p_c(h) = \sum_{h'=(l',f')} p(h|h')p(h'),$$

where:
- p(h') is the estimation of the probability of the hypothesis h at the input of the filter (73),
- p(h|h') is the conditional probability of h with respect to h' estimated using the co-occurrence map of h',
- the sum is effected on the set of hypotheses in the vicinity of h, that is to say the set of hypotheses h' for which x(h,h') is defined.

Thus, according to this embodiment of the present invention, each detected product votes for all the others according to their probability of co-occurence and their relative position. The more a product is in a usual context, the more chances it will have of being detected.

The step of estimating p''(h,θ),h∈$\mathcal{H}$' is once again followed by a decision step, in order to keep only the best hypotheses. According to the embodiment of the present invention previously described, given the optimisation of θ, it is here natural to keep the hypotheses h such that p'(h,θ)>0.5 in order to define $\mathcal{H}$.

The blocks of type (7) may succeed each other as much as necessary. According to the particularities of the product base, it will be possible to integrate various features. This so called specialisation step (43) is represented by the block in broken lines in FIG. 5.

At this level, the set of hypotheses associated with a window is very small. It is therefore possible to define very specific classifiers (4371). We have noted two cases in which a supplementary classifier (43) is necessary:
1. the case of products for which the colour is highly discriminating, whereas they resemble each other or are perfectly identical with regard to the texture (see for example FIG. 8),
2. the case of products that differ only through a small number of details in the image, such as for example for the products in FIG. 9.

In these cases, the previous classifier (42) fails, in that it does not manage to distinguish the products from each other. In practice, these products are therefore found by the previous method with probabilities of the same order of magnitude, in any order. It is particularly important to have a specific treatment if it is wished to be able to make the correct decision. We propose hereinafter to adapt the method for each of these two cases.

For the second part of the block (7), the filtering block (4373) will, according to one embodiment of the present invention, and according to requirements, be able to repeat the block (4273) or reduce itself to identity, that is to say p''=p' and $\mathcal{H}$''=$\mathcal{H}$'.

FIG. 8 is a diagram showing an example of images of two products justifying the application of an additional colour classification step (43): the texture is almost identical, and the colour (here simply a level of grey) easily makes it possible to distinguish them. FIG. 8 gives a specimen example where the classifier (42) will fail, but where a study of the colours makes it possible easily to distinguish between the products. This type of situation happens very frequently when it is necessary to distinguish between variations in aroma of a product. In this case, the method uses the colour information in the following way:
- the image of the window is converted into the colour space HSB,
- a colour histogram is extracted, by dividing the 3 dimensions of the colour space into $N_h$, $N_s$, $N_b$ parts,
- the same operation is performed on all the images of the base corresponding to the input hypotheses for this window,
- for each hypothesis, a similarity is calculated between the histogram of the window and the histogram of the hypothesis image (typically a histogram intersection),
- the probability of associating a hypothesis with the window is estimated according to this similarity.

If the colour does not suffice to resolve the ambiguities, a specific classifier for each set of hypotheses will advantageously be used, in order to distinguish between products that are different but very similar.

FIG. 9 is a diagram showing an example of images of three products justifying the application of a supplementary visual identification step (43): the visuals are perfectly identical to within a detail. In the diagram, the detail that changes between the images is simply a FIG. 2, 4, 6). FIG. 9 gives a typical example where the previous classification (42) fails, and where the colour does not make it possible to resolve the ambiguities. Only a small area of each visual makes it possible to make the difference between the products.

To take into account such slight differences, it is necessary to train a classifier making it possible to discriminate between instances of the same class of object. In object recognition, visual identification is spoken of.

The idea is to determine, for a class of objects, which are the parts of the object that make it possible to distinguish between the individuals.

When necessary, the method therefore includes a supplementary classification step, specialised in visual identification. Algorithms such as those described in the documents "Eric Nowak and Frederic Jurie. Learning Visual Similarity Measures for Comparing Never Seen Objects. 2007 *IEEE Conference on Computer Vision and Pattern Recognition*, pages 1-8, June 2007" and "A Ferencz, E G Learned-Miller, and J Malik. Learning to locate informative features for visual identification. *International Journal of Computer Vision*, 77(1):3-24, 2008" can be integrated at this level of the method.

If we return to the diagram in FIG. 4, the step following the product detection (4) is their positioning in the planogram (5). At the end of the product detection method (4), there is a set of hypotheses (4O) associated with probabilities. The following step (5) consists of positioning the products definitively in the planogram. This step of the process is very simple and consists of making a decision from these results in order to position the products.

According to one embodiment of the present invention, the procedure is as follows:
1. Ordering the hypotheses by decreasing probabilities
2. For each hypothesis h=(f,l),
   (a) Calculating the position in the planogram, that is to say in its structure (3O), according to the position of the window f in the input image,
   (b) If there is no product on the planogram at this position, adding the product l at this position.

This part is an unavoidable step in the method for automatic construction of the planogram. Once the step of positioning the products (5) has ended, the complete final planogram (6) is obtained.

We have described above how to implement the method for the automatic construction of a planogram from one or more images of shelving.

Advantageously, the invention can be used for automating various merchandising applications. In particular, the use of this method affords a considerable saving in time for the employees checking the agreement of planograms with the actual arrangement of products in the shop. It suffices for them to take photographs of the shelves, and to send them to the device implementing our method.

The invention claimed is:

1. A method for automatic construction of a planogram, comprising:
   receiving one or more shelving images,
   assembling said images, in the case where there are several,
   automatic construction of a structure constituting the planogram,
   automatic recognition of products contained in the images,
   positioning the products in the planogram according to the results of the previous automatic recognition of the products and the results of the previous detection of the structure, wherein the automatic recognition step comprises at a minimum:
   a) an initial recognition step, resulting in a set of possibilities, each possibility being in a form of an ordered pair consisting of a hypothesis and a a probability, called a detection probability, that said hypothesis is true, in which the hypothesis is an ordered pair consisting of a position in the image and an identified product, wherein this initial recognition step consists of a first classification step for classifying products according to several categories, wherein the number of categories is less than the number of products, and a first filtering step of global filtering of these results by re-evaluating the detection probability of each hypothesis in each possibility using probabilistic methods for integrating information specific to the products, and
   b) a second recognition step, using the resulting set of possibilities from the original recognition step to make a new detection, wherein this second recognition step consists of a second classification step based on matchings of points of interest, and a second filtering step at the planogram level that consists of reevaluating the detection probability of each hypothesis in each possibility using probabilistic methods for integrating global information on a context previously estimated on a base of planograms,
   each of the first classification step, first filtering step, second classification step and second filtering step being followed immediately by a selection step of selecting the best candidates, each selection step respectively corresponding to a thresholding of the detection probabilities.

2. The method according to claim 1, to which is added, following the second recognition step, a specialised recognition step comprising a step of classification and then selection of the best candidates and a step of global filtering and then selection of the best candidates, wherein the specialised recognition step uses the image colour information.

3. The method according to claim 1, to which is added, following the second recognition step, a specialised recognition step comprising a step of classification and then selection of the best candidates and a step of global filtering and then selection of the best candidates, wherein the specialised recognition step distinguishes between products that are identical to within a few details, using visual identification algorithms.

4. The method according to claim 1, wherein the specific information used in the first filtering step of the initial recognition step are of a scale type.

5. The method according to claim 1, wherein the global information used in the second filtering step of the second recognition step comprises the following measurements:
   measurements of probabilities of co-occurrences between products,
   measurements of probabilities of vertical positioning of the products,
   measurements of frequency of the products, previously estimated on a base of planograms.

6. The method according to claim 5, wherein in the second filtering step of the second recognition step, the integration of said global information with the detection results issuing from the second classification step comprises the following steps:
   a step of estimation of the probabilities that is independent for each of the probability measurements defined in the global information,
   a parameterised probabilistic combination step where the parameters are previously determined by optimisation of a global recognition level.

7. The method according to claim 1, wherein the step of automatic construction of the structure:
   precedes the automatic recognition step and uses image processing techniques, combined with the results of the assembling step,
   is used in calculating the global information.

8. The method according to claim 1, wherein the step of automatic construction of the structure of the planogram is performed using the results of the automatic recognition step, relying on the positions of the products detected, and wherein the calculation of the global information is independent of said structure.

9. The method according to claim 1, wherein the categories of the products used in the first classification step of the initial recognition step issue from a semi-supervised classification of the products, in which:
   the supervision serves only to preserve the partitioning of the images according to the products,
   a category groups together products showing the same geometric features.

10. The method according to claim 1, wherein the categories of the products used in the first classification step of the initial recognition step correspond to semantic categories of products, that is to say the first classification step is supervised.

11. The method according to claim 2, to which is added, following the second recognition step, a specialised recognition step comprising a step of classification and then selection of the best candidates and a step of global filtering and then selection of the best candidates, wherein the specialised recognition step distinguishes between products that are identical to within a few details, using visual identification algorithms.

12. The method according to claim 2, wherein the specific information used in the first filtering step of the initial recognition step are of the scale type.

13. Method The method according to claim 2, wherein the global information used in the second filtering step of the second recognition step comprises the following measurements:
   measurements of probabilities of co-occurrences between products,
   measurements of probabilities of vertical positioning of the products, measurements of frequency of the products, previously estimated on a base of planograms.

14. The method according to claim 2, wherein the step of automatic construction of the structure:
- precedes the automatic recognition step and uses image processing techniques, combined with the results of the assembling step,
- is used in calculating the global information.

15. The method according to claim 2, wherein the step of automatic construction of the structure of the planogram is performed using the results of the automatic recognition step, relying on the positions of the products detected, and wherein the calculation of the global information is independent of said structure.

16. The method according to claim 2, wherein the categories of the products used in the first classification step of the initial recognition step issue from a semi-supervised classification of the products, in which:
- the supervision serves only to preserve the partitioning of the images according to the products,
- a category groups together products showing the same geometric features.

17. The method according to claim 1, wherein the categories of the products used in the first classification step of the initial recognition step correspond to semantic categories of products, that is to say the first classification step is supervised.

* * * * *